(12) United States Patent
Lee

(10) Patent No.: US 11,598,685 B2
(45) Date of Patent: Mar. 7, 2023

(54) APPARATUS AND METHOD FOR MEASURING GROUND SUBSIDENCE USING PRESSURE GAUGE

(71) Applicant: FBG KOREA INC., Daejeon (KR)

(72) Inventor: Geum Suk Lee, Gyeryong-si (KR)

(73) Assignee: FBG KOREA INC., Daejeon (KR)

( * ) Notice: Subject to any disclaimer, the term of this patent is extended or adjusted under 35 U.S.C. 154(b) by 48 days.

(21) Appl. No.: 17/393,810

(22) Filed: Aug. 4, 2021

(65) Prior Publication Data

US 2022/0326103 A1 Oct. 13, 2022

(30) Foreign Application Priority Data

Apr. 13, 2021 (KR) ........................ 10-2021-0047557

(51) Int. Cl.
*G01L 9/00* (2006.01)
*G01L 19/00* (2006.01)
(Continued)

(52) U.S. Cl.
CPC ............ *G01L 9/0076* (2013.01); *G01C 15/00* (2013.01); *G01L 19/0007* (2013.01); *G01S 19/01* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 7/084; G01L 9/06; G01L 19/0636; G01L 13/02; G01L 19/0023; G01L 19/142;
(Continued)

(56) References Cited

FOREIGN PATENT DOCUMENTS

| CN | 106989718 A | * | 7/2017 |
| EP | 3842766 A1 | * | 6/2021 |

(Continued)

*Primary Examiner* — Andre J Allen
(74) *Attorney, Agent, or Firm* — Novick, Kim & Lee PLLC; Jae Youn Kim

(57) ABSTRACT

The present invention relates to an apparatus and a method for measuring ground subsidence using a pressure gauge, in which the apparatus includes: a plurality of pressure gauges installed along a ground surface at a subsidence reference point of ground and a plurality of measurement positions to be measured, respectively, to measure a pressure displacement at each of the measurement positions; a pressure transmission pipe filled therein with a liquid supplied from a tank installed at the subsidence reference point to transmit a pressure to each of the pressure gauges; and a measurement terminal connected to each of the pressure gauges through an optical cable, and configured to convert the pressure displacement measured by each of the pressure gauges into a height displacement to measure an amount of the ground subsidence.

12 Claims, 5 Drawing Sheets

(51) Int. Cl.
*G01S 19/01* (2010.01)
*G01C 15/00* (2006.01)

(58) Field of Classification Search
CPC ....... G01L 7/043; G01L 19/08; G01L 9/0002;
G01L 9/008; G01L 19/02; G01L 19/141;
G01L 9/006; G01L 11/02; G01L 23/18;
G01L 23/10; G01L 19/0672; G01L
19/0681; G01L 9/0077; G01L 19/12;
G01L 27/005; G01L 7/082; G01L 9/0044;
G01L 19/0015; G01L 19/0069; G01L
7/063; G01L 9/0001; G01L 19/146; G01L
21/12; G01L 9/16; G01L 11/00; G01L
27/007; G01L 27/002; G01L 9/0026;
G01L 19/00; G01L 9/0089; G01L 9/045;
G01L 9/14; G01L 1/2281; G01L 11/025;
G01L 11/008; G01L 19/0654; G01L 7/22;
G01L 9/0047; G01L 13/026; G01L
9/0076; G01L 9/0025; G01L 9/0035;
G01L 13/00; G01L 19/0061; G01L
9/0005; G01L 9/08; G01L 9/10; G01L
9/0019; G01L 11/006; G01L 21/00; G01L
7/08; G01L 9/04; G01L 9/0041; G01L
9/0008; G01L 11/004; G01L 19/086;
G01L 9/0057; G01L 19/083; G01L 1/18;
G01L 19/069; G01L 19/10; G01L 19/16;
G01L 13/023; G01L 7/048; G01L 9/0016;
G01L 9/0027; G01L 9/0086; G01L 9/00;
G01L 9/0079; G01L 11/04; G01L 9/0048;
G01L 9/0091; G01L 19/06; G01L 23/24;
G01L 7/182; G01L 11/002; G01L
19/0663; G01L 27/00; G01L 7/166; G01L
1/20; G01L 23/22; G01L 9/0036; G01L
1/02; G01L 9/0061; G01L 9/0039; G01L
23/125; G01L 9/0013; G01L 9/0092;
G01L 21/04; G01L 7/104; G01L 9/0045;
G01L 19/145; G01L 9/0033; G01L
9/0083; G01L 9/0098; G01L 1/142; G01L
7/24; G01L 1/2293; G01L 9/0029; G01L
21/22; G01L 9/02; G01L 7/022; G01L
9/0064; G01L 23/08; G01L 23/16; G01L
5/14; G01L 7/088; G01L 7/163; G01L
9/0007; G01L 1/205; G01L 23/222; G01L
9/0085; G01L 1/16; G01L 1/2212; G01L
1/2287; G01L 13/06; G01L 9/0004; G01L
21/14; G01L 23/02; G01L 9/003; G01L
9/025; G01L 9/085; G01L 1/14; G01L
1/148; G01L 9/0058; G01L 9/105; G01L
7/061; G01L 9/002; G01L 7/02; G01L
13/028; G01L 1/2231; G01L 23/28; G01L
9/0095; G01L 1/162; G01L 7/12; G01L
9/0032; G01L 9/0038; G01L 19/0076;
G01L 7/024; G01L 21/10; G01L 1/246;
G01L 19/149; G01L 7/086; G01L 1/005;
G01L 7/06; G01L 7/102; G01L 1/2206;
G01L 13/021; G01L 27/02; G01L 5/228;
G01L 1/2262; G01L 23/00; G01L 9/0094;
G01L 1/24; G01L 9/0082; G01L 1/125;
G01L 1/26; G01L 11/06; G01L 9/0097;
G01L 1/2268; G01L 21/30; G01L 21/34;
G01L 23/221; G01L 7/20; G01L 19/144;
G01L 23/26; G01L 7/068; G01L 1/225;
G01L 23/32; G01L 7/14; G01L 7/187;
G01L 1/144; G01L 1/165; G01L 23/12;
G01L 1/146; G01L 1/241; G01L 7/045;
G01L 1/086; G01L 7/108; G01L 9/18;
G01L 13/04; G01L 17/005; G01L 5/18;
G01L 1/127; G01L 1/22; G01L 1/245;
G01L 21/32; G01L 1/183; G01L 1/2218;
G01L 9/0023; G01L 1/243; G01L 23/145;
G01L 5/0047; G01L 9/0088; G01L 1/106;
G01L 5/0076; G01L 1/10; G01L 1/186;
G01L 23/223; G01L 25/00; G01L 5/165;
G01L 9/001; G01L 9/0017; G01L 1/044;
G01L 3/245; G01L 5/226; G01L 1/08;
G01L 21/16; G01L 3/1485; G01L 5/0052;
G01L 5/162; G01L 5/225; G01L 7/026;
G01L 7/065; G01L 9/0014; G01L 1/242;
G01L 21/24; G01L 3/10; G01L 5/0004;
G01L 9/005; G01L 1/00; G01L 1/04;
G01L 1/103; G01L 1/2275; G01L 1/247;
G01L 21/02; G01L 21/26; G01L 23/225;
G01L 3/102; G01L 3/105; G01L 5/0038;
G01L 5/223; G01L 5/24; G01L 7/028;
G01L 7/10; G01L 9/0011; G01L 5/243;
G01L 1/083; G01L 1/12; G01L 21/36;
G01L 23/04; G01L 23/14; G01L 23/30;
G01L 3/103; G01L 5/00; G01L 5/0028;
G01L 5/102; G01L 5/133; G01L 5/166;
G01L 7/185; G01L 1/255; G01L 21/08;
G01L 5/0033; G01L 5/0057; G01L 5/161;
G01L 1/042; G01L 1/122; G01L 1/2225;
G01L 1/2243; G01L 1/2256; G01L 1/248;
G01L 2009/0066; G01L 2009/0067;
G01L 2009/0069; G01L 21/06; G01L
23/06; G01L 3/00; G01L 3/06; G01L
3/1478; G01L 3/1492; G01L 3/18; G01L
3/24; G01L 3/242; G01L 5/08; G01L
5/10; G01L 5/101; G01L 5/108; G01L
5/16; G01L 5/1627; G01L 5/167; G01L
5/22; G01L 5/28; G01L 23/085; G01L
23/20; G01L 5/0061; G01L 5/0071; G01L
5/008; G01L 5/06; G01L 5/171; G01L
7/106
USPC .................................................. 73/700–756
See application file for complete search history.

(56) References Cited

FOREIGN PATENT DOCUMENTS

| | | |
|---|---|---|
| JP | 2001-041782 A | 2/2001 |
| JP | 3829180 B2 | 10/2006 |
| KR | 10-2009-0076567 A | 7/2009 |
| KR | 100992628 B1 | 11/2010 |
| KR | 101057309 B1 | 8/2011 |
| KR | 10-1129692 B1 | 4/2012 |
| KR | 10-2013-0098724 A | 9/2013 |
| KR | 10-2016-0090073 B1 | 7/2016 |
| KR | 10-1920874 B1 | 11/2018 |
| KR | 20220141715 A * | 5/2021 ............. G01B 13/24 |

* cited by examiner

APPARATUS AND METHOD FOR MEASURING GROUND SUBSIDENCE USING PRESSURE GAUGE

BACKGROUND OF THE INVENTION

1. Field of the Invention

The present invention relates to an apparatus and a method for measuring ground subsidence, and more particularly, to an apparatus and a method for measuring ground subsidence using a pressure gauge, capable of measuring the subsidence of ground and sagging of a structure such as a bridge by using the pressure gauge.

2. Description of the Related Art

In general, ground subsidence is measured by a scheme using leveling and a scheme using a ground surface settlement gauge.

A ground subsidence measurement scheme using the leveling includes installing a fixed point, which may not be influenced by excavation, near a site, and measuring a tip of a rod supported on a subsidence plate at a position to be measured by level surveying based on the point so as to measure an amount of subsidence. As described above, the measurement scheme using the leveling has an advantage of a low installation cost for performing the leveling. However, since a degree of error is large, and a measurement point has to be continuously moved along the rod, the measurement scheme using the leveling has disadvantages that a great deal of time is required for the measurement and an operation thereof is very dangerous on a road through which vehicles pass.

A ground subsidence measurement scheme using the ground surface settlement gauge includes drilling to a fixed layer such as a bedrock at a point to be measured to install an anchor, fixing a pipe to the fixed layer, and installing a subsidence plate on a subsidence measurement target surface so as to measure ground subsidence through a length difference between the fixed layer and a ground surface, that is, a relative displacement difference. As described above, the measurement scheme using the ground surface settlement gauge has an advantage that a variation under the ground may also be measured according to a measurement position of the anchor. However, since the pipe has to be buried to a depth of the fixed layer, the measurement scheme using the ground surface settlement gauge has disadvantages that a device installation cost is high and relative measurement between points is difficult.

Meanwhile, the applicant of the present invention has disclosed a technique of an apparatus for measuring physical quantities such as a displacement and a deformation rate by using an optical fiber grating sensor in various patent documents such as the following patent documents 1 and 2, which have been filed and registered.

The optical fiber grating sensor is configured such that a light refraction variation is induced in a grating when an optical fiber formed with the grating is deformed by an action of a physical force, and such a refraction variation may be measured to measure a deformation rate of the optical fiber, so that a deformation rate of a structure to which the optical fiber is fixed may be measured, and thus a load and stress acting on the structure may be identified.

In other words, the optical fiber grating sensor is configured such that a refractive index of an optical fiber core part varies at a predetermined interval, and configured to selectively reflect only light of a specific wavelength.

Since the optical fiber grating sensor has a unique wavelength value and very excellent physical properties such as being uninfluenced by electromagnetic waves, the optical fiber grating sensor is an excellent physical quantity measurement element replacing an existing electric gauge, so that an application range of the optical fiber grating sensor is now increasing rapidly.

Accordingly, the optical fiber grating sensor has been used as a detection sensor configured to detect physical quantities such as a deformation rate, an angle, acceleration, a displacement, a temperature, and a pressure displacement by using the principle of total reflection that all light within a predetermined angle is reflected at an interface of materials when the light travels from the material with a high refractive index to the material with a low refractive index within the optical fiber.

Therefore, development of a technique capable of precisely measuring ground subsidence through a measured variation of a pressure by measuring the variation of the pressure caused by the ground subsidence by using a pressure sensor using the optical fiber grating sensor has been required.

(Patent document 1) Korean Patent Registration No. 10-1057309 (published on Aug. 16, 2011)

(Patent document 2) Korean Patent Registration No. 10-0992628 (published on Nov. 5, 2010)

SUMMARY OF THE INVENTION

To solve the problems described above, an object of the present invention is to provide an apparatus and a method for measuring ground subsidence using a pressure gauge, capable of measuring the ground subsidence by measuring a variation of a pressure caused by the ground subsidence by applying the pressure gauge using an optical fiber grating sensor.

Another object of the present invention is to provide an apparatus and a method for measuring ground subsidence using a pressure gauge, capable of measuring the ground subsidence by converting a pressure displacement measured by the pressure gauge into a height displacement.

Still another object of the present invention is to provide an apparatus and a method for measuring ground subsidence using a pressure gauge, capable of measuring subsidence of a slope, a road, a bridge, or the like as well as subsidence of flat ground.

To achieve the objects described above, according to the present invention, an apparatus for measuring ground subsidence using a pressure gauge includes: a plurality of pressure gauges installed along a ground surface at a subsidence reference point of ground and a plurality of measurement positions to be measured, respectively, to measure a pressure displacement at each of the measurement positions; a pressure transmission pipe filled therein with a liquid supplied from a tank installed at the subsidence reference point to transmit a pressure to each of the pressure gauges; and a measurement terminal connected to each of the pressure gauges through an optical cable, and configured to convert the pressure displacement measured by each of the pressure gauges into a height displacement to measure an amount of the ground subsidence.

In addition, to achieve the objects described above, according to the present invention, a method for measuring ground subsidence using a pressure gauge includes: (a) installing a plurality of pressure gauges configured to measure a pressure displacement along a ground surface at a subsidence reference point of ground and a plurality of measurement positions to be measured, respectively; (b) filling a pressure transmission pipe with a liquid supplied from a tank installed at the subsidence reference point through the pressure transmission pipe to transmit a pressure to each of the pressure gauges; and (c) receiving, by a measurement terminal, the pressure displacement measured by each of the pressure gauges through an optical cable, and converting the received pressure displacement into a height displacement to measure an amount of the ground subsidence.

As described above, according to the apparatus and the method for measuring the ground subsidence using the pressure gauge of the present invention, the pressure gauges and the pressure transmission pipe may be installed on the ground to be measured, and the displacement of the pressure transmitted to each of the pressure gauges from the liquid filled in the pressure transmission pipe may be measured, so that the ground subsidence can be measured.

In addition, according to the present invention, the displacement of the pressure caused by the ground subsidence may be measured by using the pressure gauge configured as a pressure sensor using an optical fiber grating sensor, and the measured pressure displacement may be converted into the height displacement, so that the ground subsidence can be precisely measured.

Further, according to the present invention, a target member may be provided at each of the pressure gauges, and a value surveyed using the target member and the amount of the ground subsidence measured by each of the pressure gauges may be compared with each other, so that it is possible to diagnose whether each of the pressure gauges operates normally.

DETAILED DESCRIPTION OF THE INVENTION

Hereinafter, an apparatus and a method for measuring ground subsidence using a pressure gauge according to an exemplary embodiment of the present invention will be described in detail with reference to the accompanying drawings.

Figure 1:
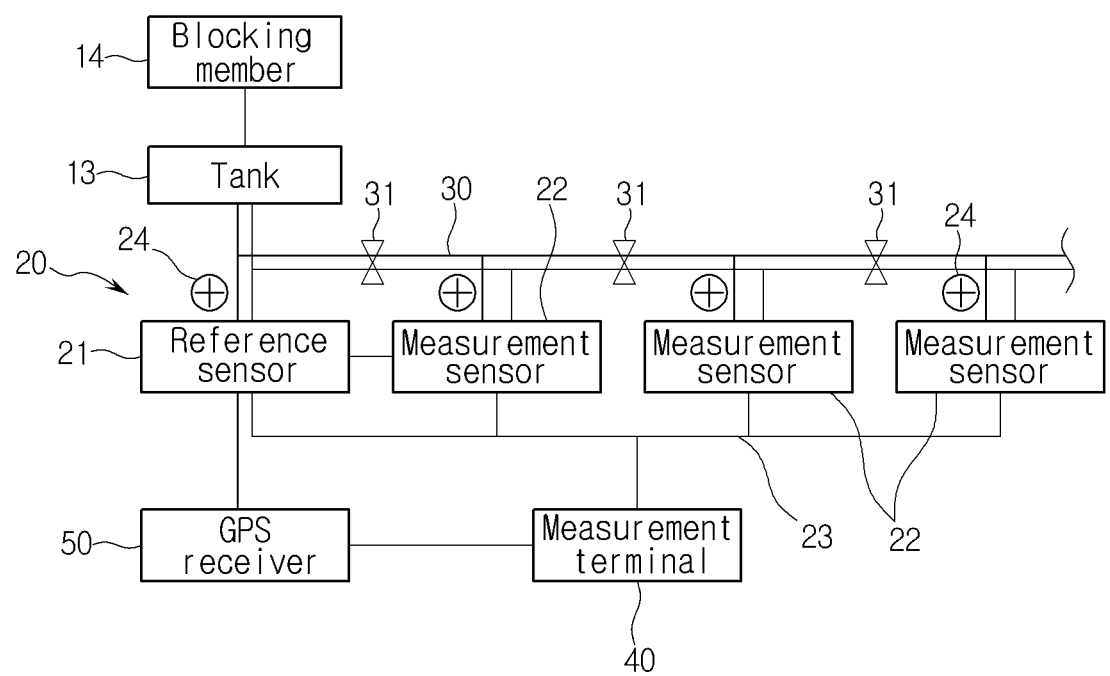
FIG. 1 is a block diagram showing an apparatus for measuring ground subsidence using a pressure gauge according to an exemplary embodiment of the present invention.
Figure 2:
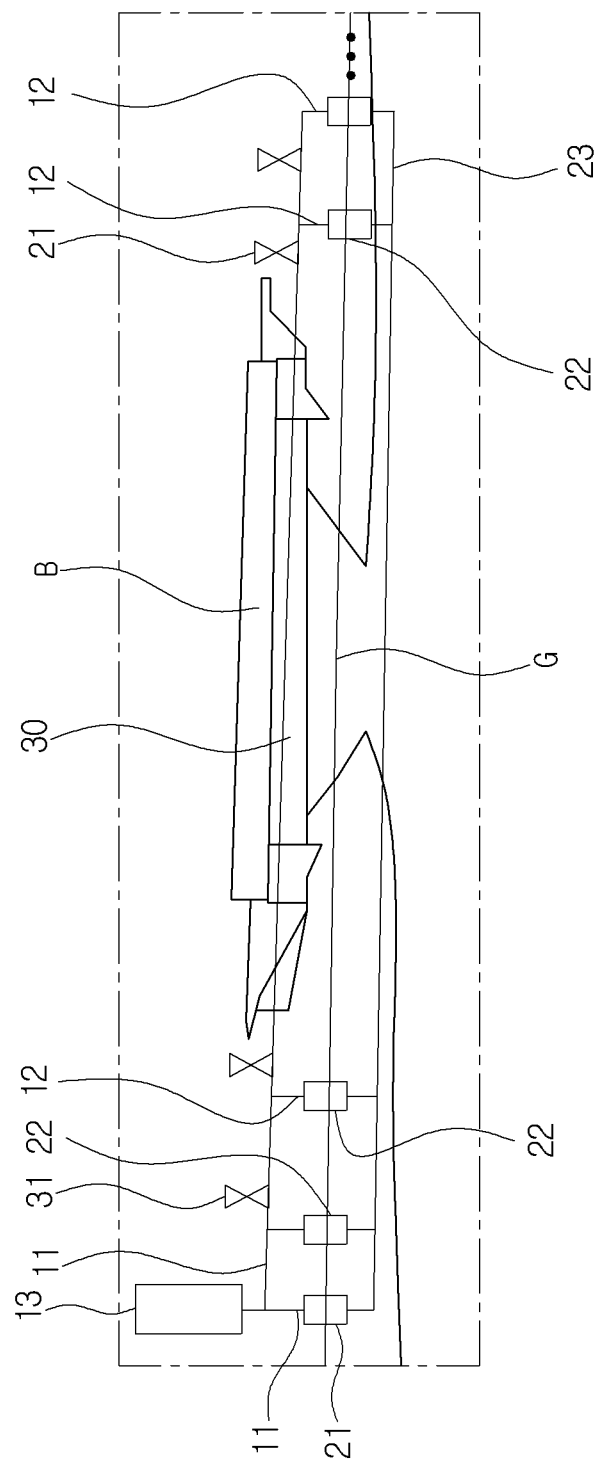
FIG. 2 is a view illustrating a state in which the apparatus for measuring the ground subsidence shown in FIG. 1 is installed.

FIG. 1 is a block diagram showing an apparatus for measuring ground subsidence using a pressure gauge according to an exemplary embodiment of the present invention, and FIG. 2 is a view illustrating a state in which the apparatus for measuring the ground subsidence shown in FIG. 1 is installed.

In the following description, terms indicating directions such as 'left', 'right', 'front', 'rear', 'upper', and 'lower' are defined as indicating individual directions based on depicted states in the drawings.

Although measurement of subsidence of flat ground will be described in the present embodiment, the present invention is not necessarily limited thereto, and the present embodiment may be modified to measure subsidence of ground or structures having various shapes, such as a slope, a road, a bridge, or a tunnel.

According to an exemplary embodiment of the present invention, as shown in FIGS. 1 and 2, an apparatus 10 for measuring ground subsidence using a pressure gauge may include: a plurality of pressure gauges 20 installed along a ground surface G at a subsidence reference point 11 of ground and a plurality of measurement positions 12 to be measured, respectively, to measure a pressure displacement at each of the measurement positions 12; a pressure transmission pipe 30 filled therein with a liquid supplied from a tank 13 installed at the subsidence reference point 11 to transmit a pressure to each of the pressure gauges 20; and a measurement terminal 40 connected to each of the pressure gauges 20 through an optical cable 23, and configured to convert the pressure displacement measured by each of the pressure gauges 20 into a height displacement to measure an amount of the ground subsidence.

In addition, according to the exemplary embodiment of the present invention, the apparatus 10 for measuring the ground subsidence using the pressure gauge may further include a GPS receiver 50 configured to receive a GPS signal to measure a displacement at the subsidence reference point 11.

Although the subsidence reference point 11 is set as a stable ground in which the ground subsidence does not occur, a movement or subsidence of the subsidence reference point 11 may be caused by a variation or a movement of entire topography.

Therefore, the measurement terminal 40 may calculate the displacement generated in X-axis, Y-axis, and Z-axis directions of the subsidence reference point 11 by using the GPS receiver 50, and may measure the subsidence at each of the measurement positions 12 based on the calculated displacement at the subsidence reference point 11.

The tank 13 in which the liquid is stored may be provided at the subsidence reference point 11, and the pressure transmission pipe 30 may sequentially connect the tank 13 to each of the pressure gauges 20 so as to function to transfer the liquid.

The liquid may be configured as water, silicone oil, antifreeze, alcohol, or the like having low viscosity.

The tank 13 is preferably installed at a position higher than the ground surface G so that the liquid may be easily transferred to each of the pressure gauges 20.

The tank 13 may include an air passage through which an external atmosphere flows, and after the pressure transmission pipe 30 and the pressure gauge 20 are installed, a blocking member 14 configured to block air inside the tank 13 from air outside the tank 13 may be connected to the air passage.

In the sealed tank 13, a pressure and a temperature inside the tank 13 may be changed by a temperature, a pressure, and the like of an outside. Accordingly, a pressure of a fluid transferred from the tank 13 to each of the pressure gauges 20 through the pressure transmission pipe 30 may be changed, so that an error may occur in a measured pressure value.

In order to solve the above problem, according to the present invention, external air may be introduced through the air passage formed in the tank during installation of the apparatus for measuring the ground subsidence so as to smoothly move the fluid.

In addition, according to the present invention, when an installation operation is completed, the blocking member 14 may be installed in the air passage to block a flow between the air outside the tank and the air inside the tank.

The blocking member 14 may function to expand to temporarily store the air inside the tank 13 according to variations of the pressure and the temperature inside the tank 13, supply the stored air back to the tank 13 so that the pressure inside the tank 13 and an atmospheric pressure are balanced, and suppress evaporation of the fluid stored inside the tank 13.

In addition, the blocking member 14 may function to block water or moisture outside the tank 13 from being introduced into the tank 13 so as to prevent the water or the moisture from being mixed with the fluid inside the tank 13.

The blocking member 14 may be configured as a film, a balloon, a cylinder, or the like formed of a rubber material having elasticity so that a volume may vary according to a variation of the pressure.

As described above, according to the present invention, the blocking member may be connected to the tank to temporarily store the air inside the tank according to a variation of an environmental condition such as the temperature and the pressure of the outside, so that the pressure inside the tank and the atmospheric pressure may be balanced, and the water or the moisture of the outside may be blocked from being introduced.

Accordingly, according to the present invention, an error of a measurement value caused by a variation of an external environmental condition may be prevented from occurring in advance, so that measurement accuracy may be improved.

The pressure transmission pipe 30 may be installed on the ground to be measured in a substantially horizontal state.

However, the present invention is not necessarily limited thereto, and the present invention may be modified such that the pressure transmission pipe 30 is installed in a vertical state to measure subsidence of each layer under the ground.

In addition, the present invention may be modified such that the pressure transmission pipe 30 is installed in a shape curved in left and right directions or inclined in order to avoid obstacles existing on the ground surface G.

In other words, the subsidence reference point 11 and the measurement positions 12 may be arranged in a substantially horizontal direction along the ground surface G. However, the ground to be measured may have different heights of the ground surface G according to the positions, a bridge B, a tunnel, or the like may be installed, and a height of the ground surface G may vary due to the ground subsidence.

Therefore, according to the present embodiment, the subsidence reference point 11 and the measurement positions 12 may be arranged in the substantially horizontal direction upon initial installation, while the horizontal state may not be maintained due to various factors after the installation.

Accordingly, according to the present embodiment, a target member 24 may be installed at each of the pressure gauges 20 to enable surveying by using a surveying device (not shown).

The target member 24 may be formed in a substantially '+' shape on one side of each of the pressure gauges 20, for example, at an upper end of each of the pressure gauges 20.

Accordingly, the measurement terminal 40 may compare a surveying value surveyed by using the target member 24 with a result obtained by measuring the amount of the ground subsidence by each of the pressure gauges 20, and diagnose whether each pressure gauge 20 operates normally based on a comparison result.

To this end, the measurement terminal 40 may store a surveying value upon the initial installation of each of the pressure gauges 20 in a memory, and compare the stored surveying value with the amount of the ground subsidence measured by each of the pressure gauges 20.

The pressure transmission pipe 30 may include a plurality of air vent valves 31 spaced apart from each other to remove the air present inside the pressure transmission pipe 30.

In other words, when the air exists inside the pressure transmission pipe 30 in a process of installing the pressure transmission pipe 30 to measure the ground subsidence, a movement of the liquid may become impossible.

Therefore, according to the present invention, the air vent valves 31 may be formed in the pressure transmission pipe 30 to easily move the liquid and fill the pressure transmission pipe 30 with the liquid, and after the apparatus 10 for measuring the ground subsidence is installed, air bubbles generated inside the pressure transmission pipe 30 may be removed by an impact or a vibration applied from the outside.

The pressure gauges 20 may include: a reference sensor 21 installed on the ground surface at the subsidence reference point 11; and a plurality of measurement sensors 22 installed at the measurement positions 12, respectively.

A configuration of a pressure sensor configured as the reference sensor 21 and each of the measurement sensors 22 will be described in detail with reference to FIGS. 3A-3B and 4.

Figure 3A:
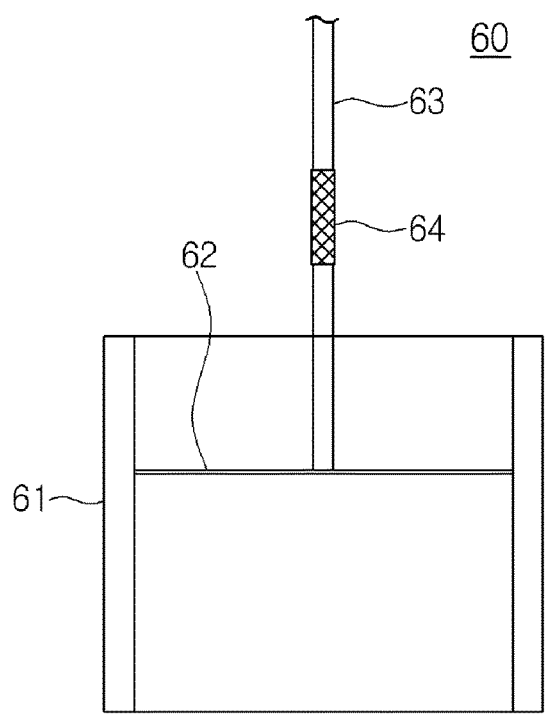
FIGS. 3A and 3B are views for describing principle of measuring a pressure displacement by using a pressure sensor using an optical fiber grating sensor.
Figure 3B:
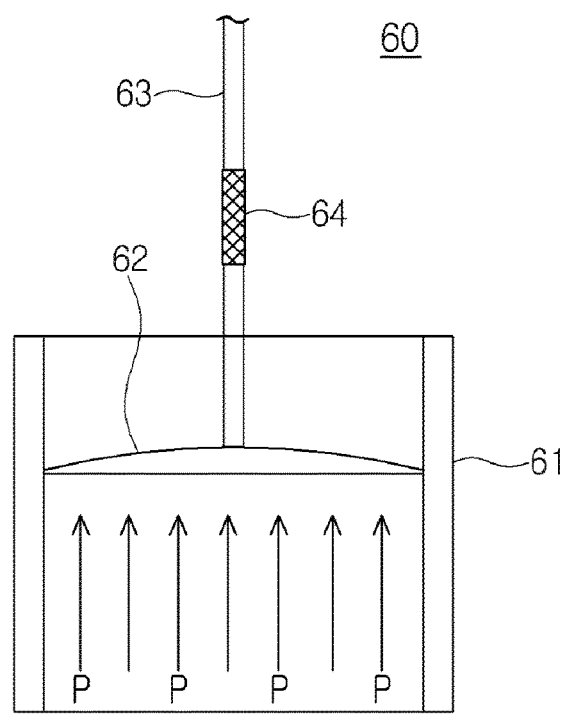

FIGS. 3A and 3B are views for describing principle of measuring a pressure displacement by using a pressure sensor using an optical fiber grating sensor, and FIGS. 3A and 3B are views for describing principle of measuring a pressure displacement by using a pressure sensor using an optical fiber grating sensor.

FIGS. 3A and 3B show an operating state of a pressure sensor using an optical fiber grating sensor, in which FIGS. 3A and 3B show a state before applying a pressure and a state in which a pressure displacement is generated after applying the pressure, respectively.

Before the pressure is applied, as shown in FIG. 3A, a diaphragm 62 formed inside a body 61 of a pressure sensor 60 may be maintained in a horizontal state. Accordingly, no external force may act on an optical fiber 63 connected to the diaphragm 62. Therefore, an optical fiber grating sensor 64 provided on the optical fiber 63 may not have an influence such as straining and contraction thereon. Accordingly, a wavelength of light traveling through the optical fiber grating sensor 64 through one end of the optical fiber 63 may not vary within the optical fiber grating sensor 64.

Meanwhile, after the pressure is applied, as shown in FIG. 3B, the diaphragm 62 inside the body 61 may be bulged upward by a pressure P applied from a lower side. As the diaphragm 62 is bulged, a vertical displacement 6 (hereinafter referred to as "pressure displacement") may occur in a central portion of the diaphragm 62. Accordingly, the optical fiber 63 and the optical fiber grating sensor 64 connected to the central portion of the bulged diaphragm 62 may receive an external force in an axial direction so as to be contracted.

Thus, the optical fiber grating sensor 64 may cause a variation of the wavelength, and the pressure sensor 60 may measure an amount of the pressure displacement 6 by using the variation of the wavelength.

On the contrary, when the pressure P is generated downward on the lower side of the diaphragm 62, the pressure displacement 6 may occur such that the diaphragm 62 may be depressed downward, so that the optical fiber 63 and the optical fiber grating sensor 64 may be strained to cause a variation into a completely different wavelength.

Figure 4:
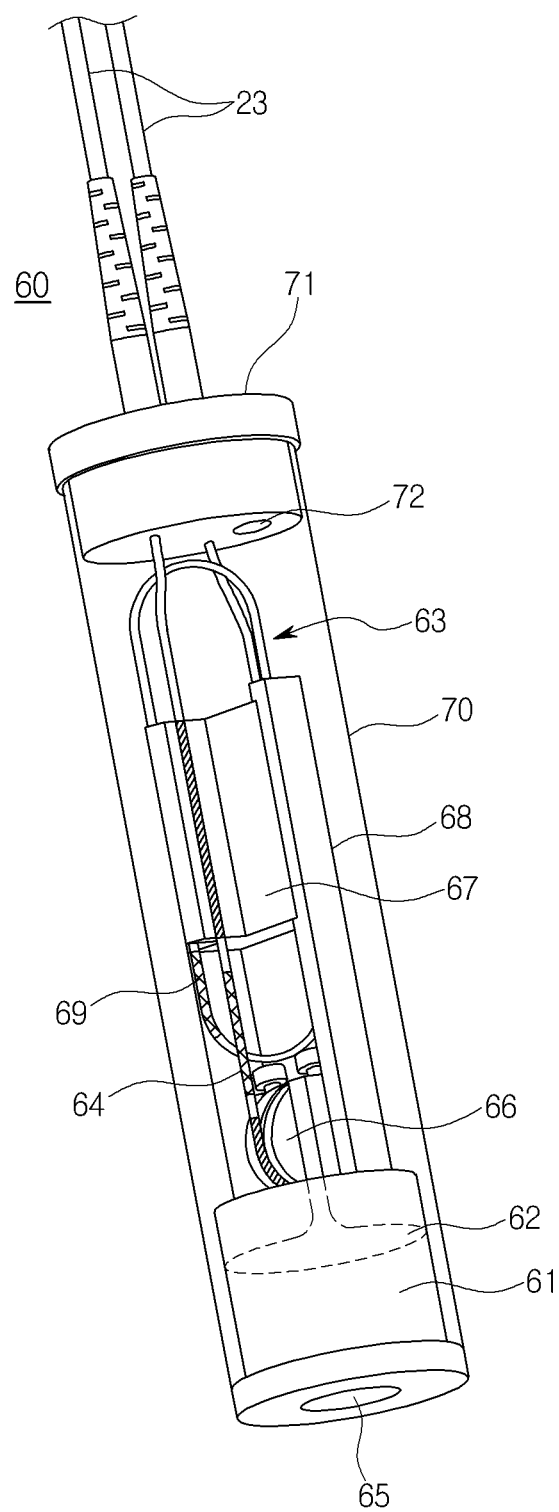
FIG. 4 is a view showing a configuration of a pressure sensor.

In detail, as shown in FIG. 4, the pressure sensor 60 may include: a body 61 provided at one end thereof with a pressure application part 65 to which a pressure is applied; a diaphragm 62 deformed so as to be bulged or depressed according to the pressure applied to the pressure application part 65; an optical fiber 63 configured to transmit a displacement measured according to the applied pressure; and an optical fiber grating sensor 64 provided on the optical fiber 63 to measure the displacement by relaxing and straining according to the applied pressure.

In addition, the pressure sensor 60 may further include: an end-side optical fiber fixing part 66 configured to fix an end of the optical fiber 63 on the diaphragm 62; an input/output-side optical fiber fixing part 67 to which an input/output part of the optical fiber 63 is firmly fixed with an adhesive agent 14; and a support 68 configured to fix and support the optical fiber 63 and the optical fiber grating sensor 64 by restraining the body 61 and the input/output-side optical fiber fixing part 67.

The pressure sensor 60 may include a separate temperature compensation optical fiber grating sensor 69 on the optical fiber 63 in addition to the optical fiber grating sensor 64 configured to measure the pressure displacement, so that the pressure sensor 60 may compensate for a variation of a wavelength according to a variation of a refractive index inside the optical fiber grating sensor 64 depending on a temperature variation inside the pressure sensor 60.

In addition, the pressure sensor 60 may compensate for a variation of a wavelength according to a variation of a refractive index inside the optical fiber grating sensor 64 depending on a temperature variation outside the pressure sensor by using the temperature compensation optical fiber grating sensor 69.

In other words, according to the present invention, the temperature compensation optical fiber grating sensor may be provided in each pressure sensor to compensate for the variation of the wavelength according to the variation of the refractive index of the optical fiber grating sensor depending on the temperature variation inside and outside the pressure sensor, so that the amount of the ground subsidence may be precisely measured.

In addition, a case 70 may be coupled to an outer surface of the pressure sensor 60 to protect the optical fiber 63, the optical fiber grating sensors 64 and 69, and the like included inside the case 70 and block an influence from the outside, and a cover 71 may be coupled to an upper end of the case 70, so that the pressure sensor 60 may be shielded from the outside.

In this case, the cover 71 may include an atmospheric pressure compensation hole 72 through which the air moves so that the pressure inside the pressure sensor 60 may be maintained to be equal to the atmospheric pressure outside the pressure sensor 60.

According to the present embodiment, the pressure application part 65 may be provided at a lower portion of the body 61 to receive the pressure so that the diaphragm 62 inside the body 61 may operate.

As described above, the pressure sensor 60 may include the pressure application part 65 provided at the lower portion of the body 61 to transmit the pressure applied from the lower side to the diaphragm 62 so as to measure the pressure displacement.

However, the present invention is not necessarily limited thereto, and the present invention may be modified such that the pressure sensor 60 shown in FIG. 4 is inverted upside down to provide the body 61 and the pressure application part 65 at an upper end of the pressure sensor 60.

Therefore, the pressure sensor 60 may be installed in both upper and lower portions of the pressure transmission pipe 30 installed at the subsidence reference point 11 and each of the measurement positions 12.

In addition, the present invention is not limited to the configuration of the pressure sensor 60 shown in FIG. 4, and the present invention may be modified such that the diaphragm 62 deformed by the pressure transmitted through the pressure application part 65 provided on one side of the body 61, the optical fiber 63, and the optical fiber grating sensor 64 are installed in various structures.

Referring again to FIGS. 1 and 2, the measurement terminal 40 may calculates a difference between the pressure displacement measured by the reference sensor 21 and the pressure displacement measured by each of the measurement sensors 22, and convert the calculated pressure displacement difference into a height displacement to determine the ground subsidence at each of the measurement positions.

Meanwhile, according to the present invention, the pressure transmission pipe 30 is not necessarily installed in a horizontal state, and the pressure transmission pipe 30 may be inclined according to a shape or a height of the ground on which the pressure transmission pipe 30 is installed and a surrounding environment such as an interfering structure, and may adjust a level of the liquid for transmitting the pressure to each of the measurement sensors 22 to cancel and compensate for a pressure displacement caused by a height difference between the measurement sensors 22.

In addition, according to the present invention, after the pressure transmission pipe 30 and the pressure gauge 20 are installed, the level of the liquid for transmitting the pressure to each of the measurement sensors 22 due to the ground subsidence may be adjusted, so that the pressure displacement may be compensated for.

For example, in a state where a limit pressure displacement that may be measured by using the pressure sensor 60 is set to be 1 m, when the ground on which the measurement sensor 22 is installed subsides to approach the limit pressure displacement, the body 61 may be supplied and filled therein with the liquid, so that the pressure inside the body 61 and the pressure applied to the pressure application part 65 may cancel each other.

Therefore, according to the present invention, the pressure sensor may be filled therein with the liquid to generate an internal pressure, so that the pressure displacement caused by the ground subsidence may be cancelled so as to adjust a measurable pressure displacement.

Next, a method for measuring ground subsidence using a pressure gauge according to an exemplary embodiment of the present invention will be described in detail with reference to FIG. 5.

Figure 5:
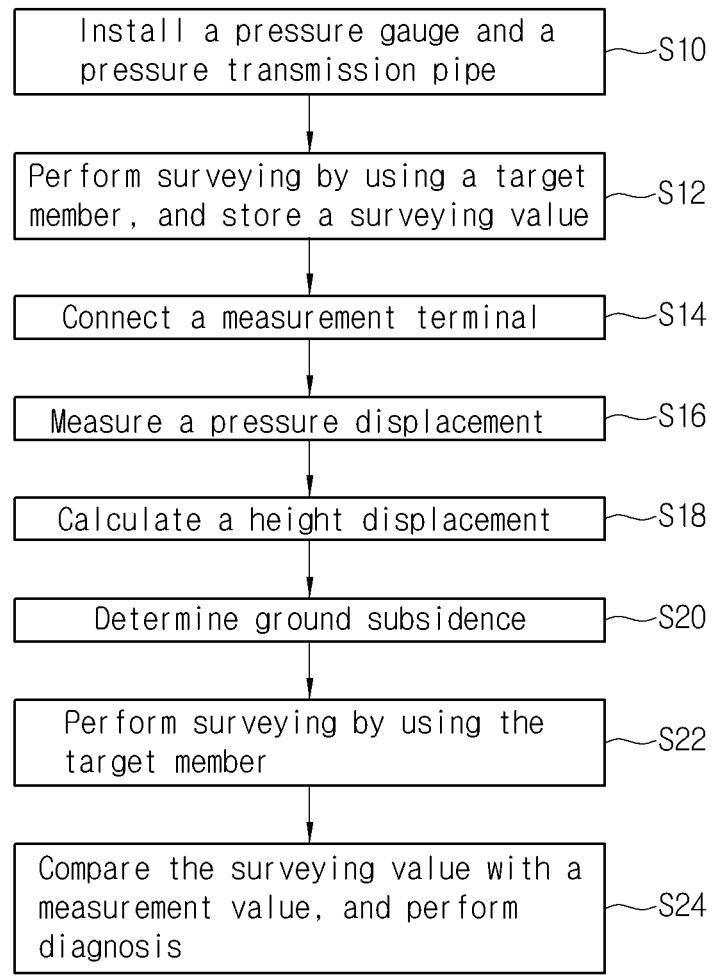
FIG. 5 is a flowchart for describing a method for measuring ground subsidence using a pressure gauge according to an exemplary embodiment of the present invention step by step.

FIG. 5 is a flowchart for describing a method for measuring ground subsidence using a pressure gauge according to an exemplary embodiment of the present invention step by step.

In a step S10 of FIG. 5, an operator may install the pressure gauge 20 and the pressure transmission pipe 30 on the ground at which the ground subsidence is to be measured.

In this case, the reference sensor 21 of the pressure gauge 20 may be installed at the subsidence reference point 11 that is set as a stable ground, and the measurement sensors 22 may be installed along the ground surface G at the measurement positions 12, respectively.

The pressure transmission pipe 30 may transmit the pressure by supplying the liquid from the tank 13 installed at the subsidence reference point 11 to the reference sensor 21 and each of the measurement sensors 22.

Therefore, the reference sensor 21 and each of the measurement sensors 22 may measure the pressure applied through the pressure application part 65, that is, the pressure displacement generated by the level of the liquid due to the ground subsidence.

Meanwhile, the operator may perform surveying by using the target member 24 provided in each of the pressure gauges 20 upon the initial installation of each of the pressure gauges 20, and the measurement terminal 40 may store the surveying value in the memory (S12).

Next, the operator may connect the optical cable 23 connected to the reference sensor 21 and each of the measurement sensors 22 to the measurement terminal 40 (S14).

Then, the reference sensor 21 and each of the measurement sensors 22 may measure the pressure displacement acting on the diaphragm 62 installed inside the body 61 as the internal pressure is changed by a variation of the level of the liquid due to deformation, that is, the subsidence of the ground by using the optical fiber 63 and the optical fiber grating sensor 64 (S16). The measurement terminal 40 may measure a pressure displacement at each point by inspecting a variation of a wavelength of light received through the optical cable 23.

In a step S18, the measurement terminal 40 may convert the measured pressure displacement at each point into a height displacement, and may determine the ground subsidence at each point by using the converted height displacement (S20).

In this case, the measurement terminal 40 may determine the ground subsidence of each measurement point based on the pressure displacement detected by the reference sensor 21 and the displacement at the subsidence reference point 11 measured through the GPS receiver 50.

Meanwhile, in a step S22, the operator may perform re-surveying by using the target member 24 provided in each of the pressure gauges 20, and the measurement terminal 40 may compare the surveying value and a re-surveying value stored in the memory with the amount of the ground subsidence measured by each of the pressure gauges 20 to diagnose whether each of the pressure gauges operates normally (S24).

Through the processed described above, according to the present invention, the pressure gauges and the pressure transmission pipe may be installed on the ground to be measured, and the displacement of the pressure transmitted to each of the pressure gauges from the liquid filled in the pressure transmission pipe may be measured, so that the ground subsidence may be measured.

In addition, according to the present invention, the displacement of the pressure caused by the ground subsidence may be measured by using the pressure gauge configured as the pressure sensor using the optical fiber grating sensor, and the measured pressure displacement may be converted into the height displacement, so that the ground subsidence may be precisely measured.

Further, according to the present invention, the target member may be provided at each of the pressure gauges, and the value surveyed using the target member and the amount of the ground subsidence measured by each of the pressure gauges may be compared with each other, so that it is possible to diagnose whether each of the pressure gauges operates normally.

Although the present invention invented by the present inventor has been described in detail with reference to the above embodiments, the present invention is not limited to the embodiments, and various modifications are possible without departing from the gist of the present invention.

The present invention may be applied to techniques of the apparatus and the method for measuring the ground subsidence using the pressure gauge, in which the pressure gauges and the pressure transmission pipe may be installed on the ground to be measured, and the displacement of the pressure transmitted to each of the pressure gauges from the liquid filled in the pressure transmission pipe may be measured, so that the ground subsidence may be measured.

What is claimed is:

1. An apparatus for measuring ground subsidence using a pressure gauge, the apparatus comprising:
    a plurality of pressure gauges installed along a ground surface at a subsidence reference point of ground and a plurality of measurement positions to be measured, respectively, to measure a pressure displacement at each of the measurement positions;
    a pressure transmission pipe filled therein with a liquid supplied from a tank installed at the subsidence reference point to transmit a pressure to each of the pressure gauges; and
    a measurement terminal connected to each of the pressure gauges through an optical cable, and configured to convert the pressure displacement measured by each of the pressure gauges into a height displacement to measure an amount of the ground subsidence.

2. The apparatus of claim 1, wherein the pressure gauges include:
    a reference sensor installed at the subsidence reference point; and
    a plurality of measurement sensors installed at the measurement positions, respectively, and each of the reference sensor and the measurement sensors includes:
    a body provided at one end thereof with a pressure application part to which the pressure is applied;
    a diaphragm deformed so as to be bulged or depressed according to the pressure applied to the pressure application part;
    an optical fiber connected to the diaphragm, and configured to transmit a displacement measured according to the pressure applied to the diaphragm; and
    an optical fiber grating sensor provided on the optical fiber, and configured to measure the displacement by relaxing or straining according to the applied pressure.

3. The apparatus of claim 2, wherein the pressure gauge includes a target member to enable surveying, and
    the measurement terminal is configured to compare a surveying result obtained by using the target member with the amount of the ground subsidence measured by the pressure gauge to diagnose whether the pressure gauge operates normally.

4. The apparatus of claim 2, wherein a case is coupled to an outer surface of each of the reference sensor and the measurement sensors to protect the optical fiber and optical fiber grating sensor included inside the case and block an influence from an outside, a cover is coupled to one end of the case, and the cover includes an atmospheric pressure compensation hole through which air moves so that a pressure inside each pressure sensor is maintained to be equal to an atmospheric pressure outside each pressure sensor.

5. The apparatus of claim 2, wherein the pressure transmission pipe is installed along the ground to be measured, and the pressure transmission pipe includes a plurality of air vent valves spaced apart from each other.

6. The apparatus of claim 2, wherein the pressure transmission pipe is inclined according to a shape or a height of the ground on which the pressure transmission pipe is installed and a surrounding environment, and configured to adjust a level of the liquid for transmitting the pressure to each of the measurement sensors to cancel and compensate for a pressure displacement caused by a height difference between the measurement sensors.

7. The apparatus of claim 2, wherein, while the pressure transmission pipe and the pressure gauge are installed, the pressure transmission pipe is configured to adjust a level of the liquid for transmitting the pressure to each of the measurement sensors to generate an internal pressure of each of the measurement sensors so as to cancel a pressure displacement caused by the ground subsidence to adjust a measurable pressure displacement.

8. The apparatus of claim 2, wherein the tank includes an air passage through which an external atmosphere flows, after the pressure transmission pipe and the pressure gauge are installed, a blocking member configured to block air inside the tank from air outside the tank is connected to the air passage, and the blocking member is configured to expand to temporarily store the air inside the tank according to variations of a pressure and a temperature inside the tank, supply the stored air back to the tank so that the pressure inside the tank and an atmospheric pressure are balanced, suppress evaporation of a fluid stored inside the tank, and block water or moisture outside the tank from being introduced into the tank.

9. The apparatus of claim 2, further comprising a GPS receiver configured to receive a GPS signal to measure a displacement at the subsidence reference point, wherein the measurement terminal is configured to calculate the displacement generated at the subsidence reference point by the GPS receiver, and measure subsidence at each of the measurement positions based on the calculated displacement at the subsidence reference point.

10. A method for measuring ground subsidence using a pressure gauge, which uses an apparatus for measuring ground subsidence according to claim 1, the method comprising:

(a) installing a plurality of pressure gauges configured to measure a pressure displacement along a ground surface at a subsidence reference point of ground and a plurality of measurement positions to be measured, respectively;

(b) filling a pressure transmission pipe with a liquid supplied from a tank installed at the subsidence reference point through the pressure transmission pipe to transmit a pressure to each of the pressure gauges; and (c) receiving, by a measurement terminal, the pressure displacement measured by each of the pressure gauges through an optical cable, and converting the received pressure displacement into a height displacement to measure an amount of the ground subsidence.

11. The method of claim 10, further comprising:

(d) surveying the measurement positions by using target members provided at the pressure gauges, respectively; and (e) comparing, by the measurement terminal, a surveying value at each of the measurement positions with the amount of the ground subsidence measured by using each of the pressure gauges to diagnose whether each of the pressure gauges operates normally.

12. The method of claim 11, further comprising (f) receiving, by a GPS receiver, a GPS signal to measure a displacement of the subsidence reference point, wherein, in the step (c), the measurement terminal is configured to calculate the displacement generated at the subsidence reference point by the GPS receiver, and measure subsidence at each of the measurement positions based on the calculated displacement at the subsidence reference point.

* * * * *